(12) United States Patent
Dash et al.

(10) Patent No.: US 11,477,797 B2
(45) Date of Patent: *Oct. 18, 2022

(54) NETWORK EVENT BASED SECURITY AND HOME AUTOMATION

(71) Applicant: SEMICONDUCTOR COMPONENTS INDUSTRIES, LLC, Phoenix, AZ (US)

(72) Inventors: Debashis Dash, Newark, CA (US); Bahador Amiri, Saratoga, CA (US)

(73) Assignee: ON SEMICONDUCTOR CONNECTIVITY SOLUTIONS, INC., San Jose, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 16/525,230

(22) Filed: Jul. 29, 2019

(65) Prior Publication Data

US 2019/0357228 A1    Nov. 21, 2019

Related U.S. Application Data

(63) Continuation of application No. 15/436,852, filed on Feb. 19, 2017, now Pat. No. 10,368,360.

(Continued)

(51) Int. Cl.
| | | |
|---|---|---|
| *H04W 72/08* | (2009.01) | |
| *H04L 12/28* | (2006.01) | |
| *H04L 5/00* | (2006.01) | |
| *H04W 24/02* | (2009.01) | |
| *H04W 88/08* | (2009.01) | |
| *H04W 84/12* | (2009.01) | |
| *H04W 88/02* | (2009.01) | |
| *H04W 24/08* | (2009.01) | |

(52) U.S. Cl.
CPC .......... *H04W 72/085* (2013.01); *H04L 5/006* (2013.01); *H04L 12/2803* (2013.01); *H04W 24/02* (2013.01); *H04W 24/08* (2013.01); *H04W 84/12* (2013.01); *H04W 88/02* (2013.01); *H04W 88/08* (2013.01)

(58) Field of Classification Search
CPC ..... H04W 72/08; H04W 84/12; H04W 24/02; H04L 12/2803; H04L 5/006
See application file for complete search history.

(56) References Cited

U.S. PATENT DOCUMENTS

| | | |
|---|---|---|
| 9,078,153 B1 | 7/2015 | Schelstraete et al. |
| 9,107,090 B1 | 8/2015 | Amiri et al. |

(Continued)

*Primary Examiner* — Charles C Jiang
*Assistant Examiner* — Thad N Defauw
(74) *Attorney, Agent, or Firm* — Maschoff Brennan

(57) ABSTRACT

Methods and systems of a wireless access point (WAP) configured to support wireless communications on a wireless local area network (WLAN). In an example system, a WAP with a non-volatile memory storing network event rules that indicate conditional parameters for an action for a targeted device, includes an event detection circuit to gather and analyze wireless communications activity, and a rule initiation circuit to initiate an action for a target device indicated by a network event rule. In an example, the rule initiation circuit is to initiate an action for a target device indicated by a network event rule, where the conditional parameters are satisfied at least in part by the gathered wireless communications activity from the one or more wireless stations.

22 Claims, 5 Drawing Sheets

Related U.S. Application Data

(60) Provisional application No. 62/305,132, filed on Mar. 8, 2016.

(56) References Cited

U.S. PATENT DOCUMENTS

| | | |
|---|---|---|
| 2006/0109967 A1 | 5/2006 | Kouchri et al. |
| 2006/0239333 A1* | 10/2006 | Albert ............... H04W 72/0406 375/130 |
| 2007/0073820 A1 | 3/2007 | Chandhok et al. |
| 2008/0125101 A1* | 5/2008 | Bakos ............... H04M 1/72569 455/418 |
| 2011/0169612 A1* | 7/2011 | Alicot ................ G06K 7/10009 340/10.4 |
| 2011/0246148 A1 | 10/2011 | Gupta et al. |
| 2011/0314330 A1 | 12/2011 | Morimura et al. |
| 2013/0159408 A1* | 6/2013 | Winn .................... G06Q 10/10 709/204 |
| 2013/0281021 A1 | 10/2013 | Palin et al. |
| 2014/0176310 A1* | 6/2014 | Kotlicki ................ G08C 17/02 340/12.5 |

* cited by examiner

WiFi Network Event Based Security & Home Automation

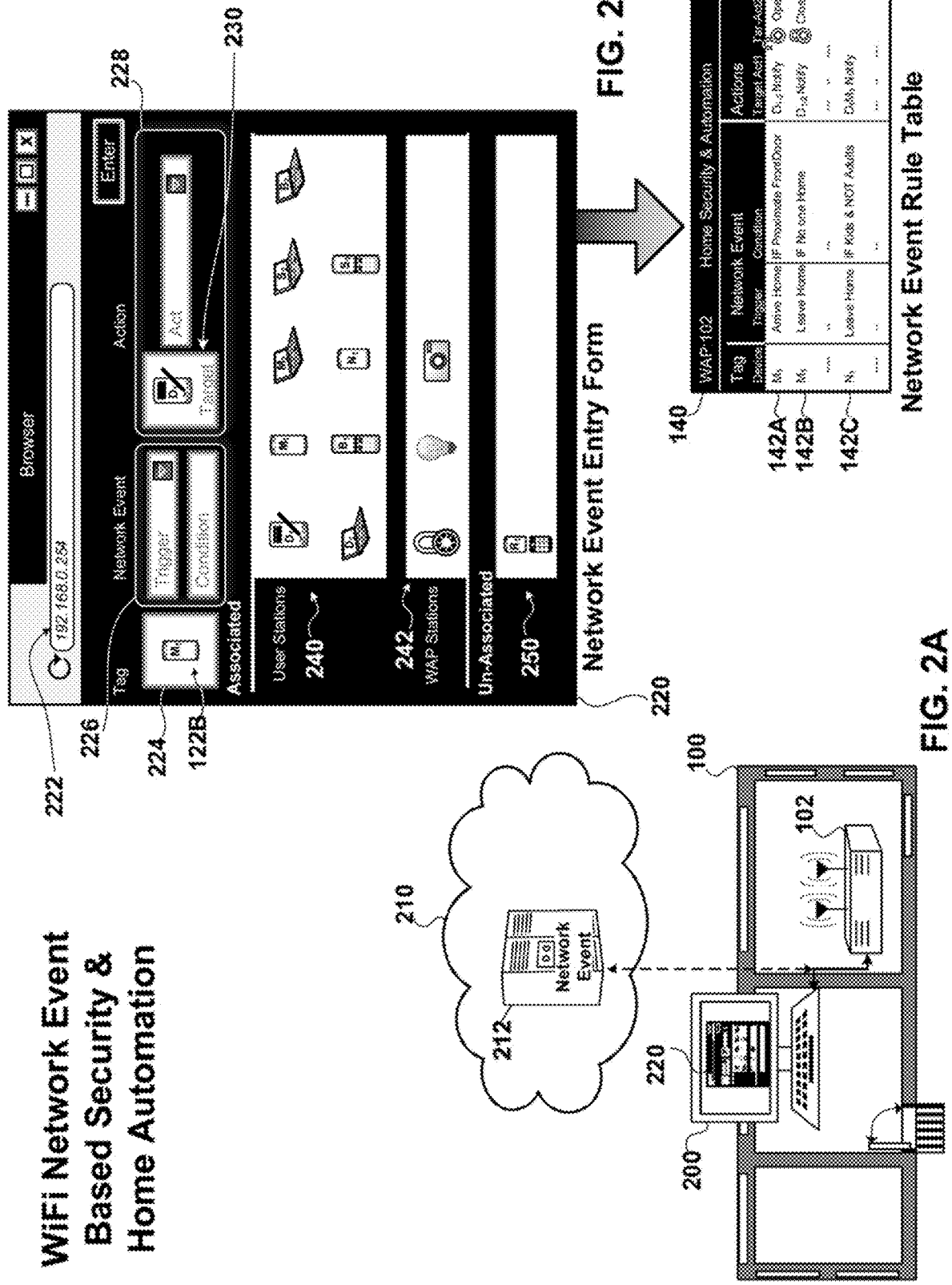

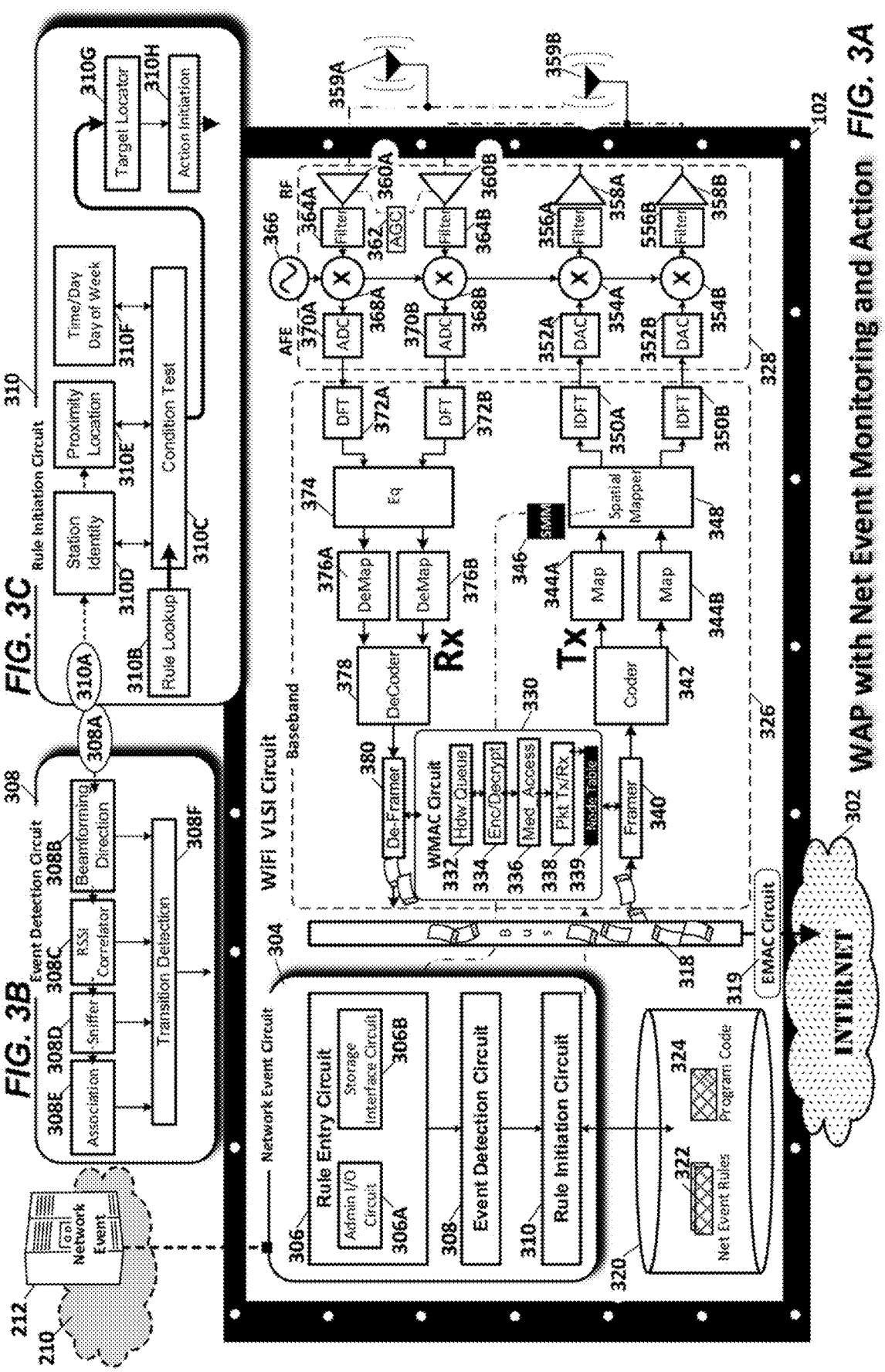

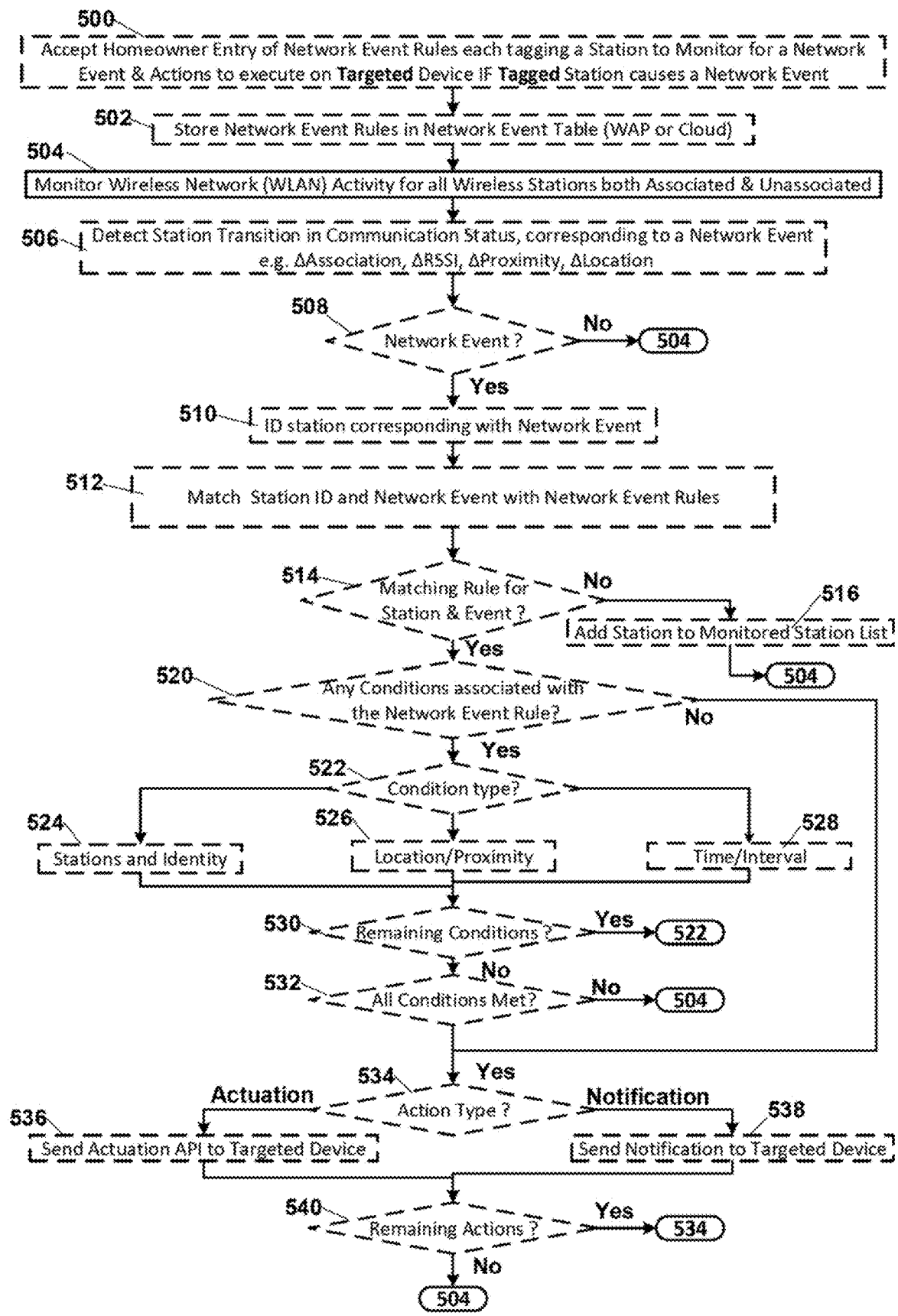
*FIG. 5*   Method for Network Event Based Home Security & Automation

NETWORK EVENT BASED SECURITY AND HOME AUTOMATION

CROSS REFERENCE TO RELATED APPLICATION

This application claims the benefit of prior filed Provisional Application No. 62/305,132 filed on Mar. 8, 2016 entitled "Network Event Based Security and Home Automation" and Non-Provisional application Ser. No. 15/436,852 filed on Feb. 19, 2017 entitled "Network Event Based Security and Home Automation" which are incorporated herein by reference in its entirety as if fully set forth herein.

BACKGROUND OF THE INVENTION

1. Field of Invention

The field of the present invention relates in general to wireless local area networks including wireless access points (WAP) and security and home automation methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Carrier Sense Multiple Access (CSMA). CSMA is a distributed random access methodology for sharing a single communication medium, by having a contending communication link back off and retry access when a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

Despite the increasing reliance on WAPs to service home and business communication requirements there has been little change in the functions provided by the WAP. What is needed are improved methods for operating wireless local area networks in homes and businesses.

SUMMARY OF THE INVENTION

The present invention provides a method and apparatus for a wireless access point (WAP), individually or collectively with a remote server to provide network event based security and home automation.

In an embodiment of the invention a wireless access point (WAP) is configured to support wireless communications with wireless stations on at least one selected wireless communication channel on a wireless local area network (WLAN) within a structure. The WAP includes a plurality of transmit and receive components, a non-volatile memory, an event detection circuit and a rule initiation circuit. The plurality of components couple to one another to form transmit and receive paths for processing wireless communications on the at least one selected wireless communication channel. The non-volatile memory stores network event rules, each of which tags a station to monitor and actions to initiate for a targeted device if the tagged station undergoes a network event. The event detection circuit monitors each wireless station for a transition in communication status corresponding to a network event, and identifies the wireless station and the network event. The rule initiation circuit determines whether the identified station and network event corresponds with one of the network event rules for the identified station in the non-volatile memory, and in the event of a match, initiates the action prescribed for the corresponding targeted device.

The invention may be implemented in hardware, firmware, circuits or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-C are respectively a system view, a graphical user interface, and a data structure diagram, of a wireless local area network (WLAN) event based security and home automation system in accordance with an embodiment of the invention;

FIGS. 3A-C are hardware block diagrams of embodiments of respectively the WAP and detailed hardware block diagrams of the station transition, condition test and action initiation circuits of the network event circuit which are part of the WAP;

FIG. 5 is a process flow diagram of processes associated with network event based security and home automation in accordance with an embodiment of the current invention.

DETAILED DESCRIPTION OF THE EMBODIMENTS

Figure 1:
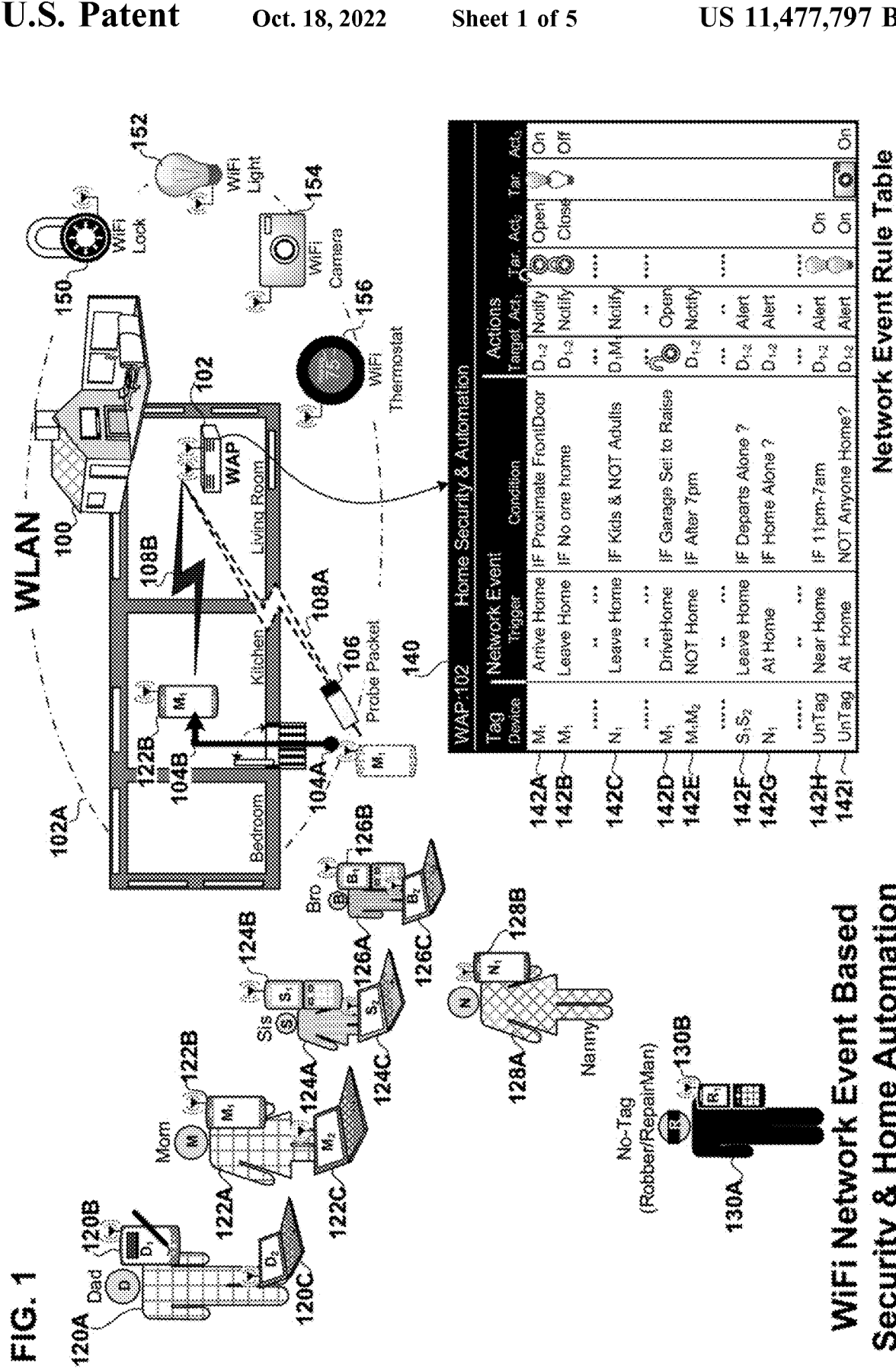
FIG. 1 is a system view of a wireless local area network event based security and home automation system in accordance with an embodiment of the invention.

FIG. 1 is a system view of a wireless local area network event based security and home automation system in accordance with an embodiment of the invention. A home 100 is shown in plan view. The residence 100 includes numerous wireless devices, a.k.a. stations or clients, which associate with a wireless access point (WAP) 102 to form a wireless local area network, the radio frequency coverage of which 102A extends around the perimeter of the home. Some of the wireless devices belong to individual members of the household such as mobile phones, notebook computers and tablets. These include: the personal mobile phone 120B and notebook computer 120C which belong to Dad 120A; the mobile phone 122B and notebook 122C which belong to Mom 122A; the mobile phone 124B and notebook 124C which belong to Sister 124A; the mobile phone 126B and notebook 126C which belong to Brother 126A; the mobile phone 128B which belongs to the kid's babysitter/nanny 128A. Some of the wireless devices are integrated into the home for the benefit of the whole family such as: a WiFi activated lock 150, a WiFi activated light switch 152, a WiFi activated camera 154, and a WiFi activated thermostat 156. These latter integrated wireless devices are in an embodiment of the invention coupled wirelessly/wired to and activated by the WAP when corresponding network event rules shown in table 140 call for that activation. Each network event rule tags a wireless station to monitor for specific network event, and an action to initiate on a targeted device when that specific network event is detected.

The network event rules shown in table 140 may be entered into the WAP by the home or business owner, or may be programmatically entered by the WAP itself based on behavioral patterns of the occupants detected by the WAP, e.g. Mom arrives home as detected by the association of her mobile phone 122B with the WAP and turns up the thermostat 156. The WAP can even be programmed with network event rules for wireless devices belonging to people who are not members of the household and whose wireless devices are not tagged. A network event rule can be tagged to "wildcard" or untagged devices such as mobile phone 130B belonging to $3^{rd}$ parties such as robbers, repairman, or guests 130A.

Typically a tagged/untagged wireless device triggers a network event when the WAP determines that its: a) association status with respect to the WAP has changed, from associated to unassociated and vice-versa; b) received signal strength indication (RSSI) has increased or decreased above a threshold amount; c) proximity toward or away from the WAP has changed;

and d) location around and within the home has changed. In the example shown in the plan view of home 100 Mom arrives home with her mobile phone 122B. As she approaches the door to the home at location 104A, her phone initiates a connection with the WAP by sending a probe packet 106. The WAP receives this packet over link 108A, and initiates the authentication and association process which is part of the IEEE 802.11 standard. By the time Mom enters the kitchen her mobile phone 122B at location 104B has associated over link 108B with the WAP 102. The WAP detects any one or all of these changes in: proximity, location, RSSI and Association status of Mom's phone, as a network event and proceeds to determine if the event corresponds with one or more of the network event rules in table 140.

In table 140 each row corresponds to a network event rule for a tagged device and each column corresponds to a field of each rule. The $1^{st}$ column identifies the tagged device by medium access control (MAC) address, or by an icon, or other unique identifier. Tagging may also include friendly labels for the tagged device, such as "Mom's Phone" or "Dad's notebook". A "wildcard" tag is available which lets any unidentified phone or other mobile wireless device be tagged so that when the WAP detects its presence in or around the home a network event may be triggered.

The $2^{nd}$ column identifies the network event for the tagged phone that will act as a trigger initiating the action(s) delineated for the rule. Network events include changes for the tagged device: in association status, or changes above a threshold amount in any one or all of: RSSI, proximity or location. Network events may also include friendly labels for the event, such as "Arrive Home" or "Leave Home" or "Near Home" or "Outside home" or "Not home".

The $3^{rd}$ column lists conditions precedent, if any, to initiating the action(s) prescribed by the network event rule. The $4^{th}$ column lists a targeted device on which to initiate the action shown in the $5^{th}$ column. The $6^{th}$ column lists a targeted device on which to initiate the action shown in the $7^{th}$ column. The $8^{th}$ column lists a targeted device on which to initiate the action shown in the $9^{th}$ column.

Each network event rule tags a station to monitor for a network event and actions to execute on one or more targeted devices if the tagged station undergoes a network event. In an embodiment of the invention, a 'wild card' tag may be applied to a rule, thereby making the rule applicable to any new or unidentified stations that are within range of the WAP. In another embodiment of the invention each network event rule may include one or more conditions the fulfillment of which is required before initiating the corresponding action. Examples of such conditions include: station association or connection status, station location or proximity relative to the WAP. Additional conditions may include: time of day, e.g. day or night, or day of week, e.g. weekdays or weekends.

After the homeowner has tagged each family member's wireless device(s) with network event rules, on a WAP administrative GUI such as that shown in FIG. 2C the following example home security and automation scenarios are practicable using the native capabilities of the WAP, or a WAP operating cooperatively with a remote computer device on a Telco service 'Cloud'.

Network event rule 142A: tags Mom's cell phone as the device to monitor and the triggering network event as her arrival at home. The rule includes a condition, e.g. that Mom be near to the front door, before any of the action(s) on one or more targeted devices are initiated. When the probing by Mom's phone as it approaches the door at position 104A is detected by the WAP that network event triggers the testing of the condition(s) if any, and if met the actions of: notifying Dad's mobile phone and Notebook that Mom is home; initiating the opening of the front door and turning the lights on. The triggering may be based exclusively on change in association status of Mom's phone from unassociated-to-associated as detected by the WAP, or less crudely by the WAP's determination based on either RSSI, or Multiple-input Multiple-output beamforming direction of link 108A the door at which Mom is entering the house.

Network event rule 142B: tags Mom's cell phone as the device to monitor and the triggering network event as her departure from the home. The rule includes a condition, e.g. that no one else is home, before any of the action(s) on one or more targeted devices are initiated. The prescribed condition would be tested by determining whether any stations belonging to other household members or business employees are currently associated with the WAP, and if not then initiating the designated action(s) on the targeted device(s), e.g. turning off the light switch or lowering the temperature of the structure. When Mom's phone disassociates from the WAP as she leaves the door, the WAP's detection of this network event triggers the testing of the condition(s), and if met, the actions of: notifying Dad's mobile phone and Notebook that Mom has left home; initiating the locking of the front door and turning the lights off. The triggering may be based exclusively on change in association status of Mom's phone from unassociated-to-associated as detected by the WAP.

Network event rule 142C: tags the babysitter's, a.k.a. Nanny's, mobile phone 128B as the device to monitor and the triggering network event as her departure from the home. The rule includes a condition, e.g. that either or both the kids are home alone, i.e. without their parents, before any of the action(s) on one or more targeted devices are initiated. The prescribed chained condition would be tested by the WAP's determining from its node table, whether any stations belonging to the kids are currently associated with the WAP, and if so, determining whether any stations belonging to either parent is currently associated with the WAP. When the determination is made that no parent is at home with the kid(s) then the designated action(s) are initiated on the targeted device(s) in this case Dad's and Mom's phones to which the WAP sends a notification.

Network event rule 142D: tags the Mom's mobile phone 122B as the device to monitor and the triggering network event as her arrival at home. The rule includes a condition, e.g. that it is Mom who is trying to open the garage door with a remote, before any of the action(s) on one or more targeted devices are initiated. When Mom's phone as it approaches the door is detected by the WAP that network event triggers the WAP to allow her remote activation of the door opener to continue allowing the garage door to open. This rule provides an extra level of security to the operation of the garage door opener by requiring WAP validation that the party pressing the remote is a member of the household as evidenced by their possession of a tagged device, i.e. phone 122B, and further by the current association of that device with the WAP.

Network event rule 142E: tags the Mom's mobile phone 122B and notebook computer 122C as the devices to monitor and the triggering network event as her absence from the home. The rule includes a condition, e.g. that Mom is not home after an expected time, e.g. 7 pm. At 7 pm the WAP checks its node table to determine if either of Mom's devices is currently associated with the WAP. If the condition is met, i.e. that Mom is not home after 7 pm as evidenced by the absence of either of her personal devices in the node table, then the prescribed action is initiated, e.g. notifying Dad of her absence.

Network event rule 142F: tags the sisters mobile phone 124B and notebook computer 124C as the devices to monitor and the triggering network event as her leaving the home. The rule includes a condition, e.g. that when she leaves home it needs to be with an adult, e.g. one of her parents or the babysitter. The triggering network event is her departure from the home, as detected by the WAP, in the form of decreased RSSI followed by disassociation. At that point the WAP determines, on the basis of its rolling association history in its successively saved node table snapshots, whether the sister's departure coincided in time with the disassociation of one of the parents of babysitters mobile or computer devices. If it did, then the presumption is that Sis left home with that adult. If none of the adult's devices concurrently disassociated from the WLAN then the Network event's condition is met, and the prescribed actions are initiated. This includes initiating the transmission of alerts to Dad's two target devices, i.e. phone and notebook computer, that Sis has left the house unaccompanied by an adult.

Network event rule 142G: tags the Nanny's mobile phone 128B as a device to monitor and the triggering network event as her presence in the home, as evidenced in the association/node table maintained by the WAP. The rule includes a condition, e.g. that Nanny is at home alone with no other family member, adult or child, in the home with her. After the triggering event, the WAP periodically checks its association table, a.k.a. its node table, to determine if any of the family's wireless devices are currently associated with the WAP. If the condition is met, i.e. that Nanny is at home alone, as evidenced by her cell phone's current association with the WAP and by the absence of any of the other family member's wireless devices in the association table, then the prescribed action is initiated, e.g. notifying Dad of her presence.

Network event rule 142H: uses the 'wildcard' tag applicable to all new wireless devices or untagged wireless devices that have never been tagged by the homeowner as devices to be monitored, whether or not associated with the WLAN. Some of these devices are discovered by the WAP as a result of their probe requests. The identity of others of these devices is discovered by the WAP during channel scanning and deep packet inspection of any intercepted communications to or from these devices. The triggering network event is the WAP's discovery of these devices within its range, i.e. proximate to the home. The WAP then checks the condition(s) delineated in the rule, i.e. that the time of discovery falls in the interval between 11 pm and 7 am. If the condition is met, then the prescribed actions are initiated by the WAP. An intruder alert is sent to the target device(s), e.g. Dad's mobile phone and notebook computer, and the outdoor lights on the residence are turned on, via an API command from the WAP to the switch for the outdoor lights.

Network event rule 142I: also uses the 'wildcard' tag applicable to all new wireless devices or untagged wireless devices that have never been tagged by the homeowner as devices to be monitored, whether or not associated with the WLAN. Some of these devices are discovered by the WAP as a result of their probe requests. The identity of others of these devices is discovered by the WAP during channel scanning and deep packet inspection of any intercepted communications to or from these devices. The triggering network event is the WAP's discovery of these devices. The WAP then checks the condition(s) delineated in the rule, i.e. that the untagged device is within the home and that no other family member is also in the home. This latter determination is made by the WAP on the basis of its node table listing currently associated family devices. If the condition is met, i.e. that no family devices are currently in the home, then the prescribed actions are initiated by the WAP. An intruder alert is sent to the target device(s), e.g. Dad's mobile phone and notebook computer, and the lights in the residence are turned on, via an API command from the WAP to the switch for the lights and any security camera or video camera in the home is turned on.

The same security and automation features discussed above are available to a business. Tagged devices can include stationary WiFi enabled equipment such as printers or scanners or copiers, with the applicable network rule, used to monitor these assets and notify the owner if they are lost, stolen, inactive or failed as evidenced by their disassociation from the corresponding WLAN.

FIGS. 2A-C are respectively a system view, a graphical user interface, and a data structure diagram, of a wireless local area network (WLAN) event based security and home automation system in accordance with an embodiment of the invention.

FIG. 2A is a system view of a wireless local area network (WLAN) event based security and home automation system in accordance with an embodiment of the invention in which the WAP includes a connection to a remote network event computer server device 212 provided by a Telco or Internet Service Provider's (ISP) cloud 210. In this embodiment of the invention the WAP and the ISP's remote computer device 212 operate together to provide the aforesaid WiFi network event based security and home or business automation. A plan view of home 100 is shown with the WAP 102 and a desktop computer 200. The WAP is coupled to the remote computer device 212. The desktop computer 200 is wire/wirelessly coupled to the WAP. A graphical user interface (GUI) 220 is shown for entering the network event rules. The GUI may be provided directly by the WAP, or from the remote computer device 212.

FIG. 2B is the data structure diagram of the network event rule table 140 shown in FIG. 1.

FIG. 2C is a detailed view of the network event entry form GUI 220 from which the home or business owner can enter the network events rules into the network event rule table 140. This GUI can be provided by WAP 102 or the remote network event computer device 212 in alternative embodiments of the invention. The network event entry form in the embodiment of the invention shown in FIG. 2C is shown as an HTML web page provided in the user's browser over the local network. It could alternately be provided as a dedicated application, or as a webpage from the Telco/ISP's network event rule setup site.

The form is accessed in this embodiment of the invention as a web page 220 accessible via entry into the browser's address/URL entry field 222 of the URL for the WAP on either the local area network, or via the Internet from the Telco's network event remote computer device 212.

The form includes sliding windows 240-242 in which the wireless devices associated with the WAP are shown. In the embodiment of the invention shown these associated devices are split into two groups. Sliding window shows user stations 240 and sliding window 242 shows the remaining associated stations, a.k.a. WAP stations. The stations identified as WAP stations are those not affiliated with any particular user, rather devices providing security and automation to the home for example such as: remotely controllable locks, light switches and surveillance devices such as cameras. All these devices have been at one time or another associated with the WAP, and the WAP and or the remote computer device 212 retains their identities and relevant access URL's. Sliding window 250 shows stations that have been in range of the WAP but which have not associated with the WAP. These stations could be the WiFi enabled mobile phones of: delivery or repair people; neighbors, guests or visitors; and intruders or robbers. The WAP or the remote computer device retains identity and capability information for these devices. The WAP constantly updates both the Associated and unassociated station lists 240-242 and 250.

The form also includes: a tagged device field 224, network event fields 226 and action fields 228. The network event fields 226 include: a dropdown list trigger field to select the triggering event, e.g. leaving or entering the home or business; and a condition field for entering applicable conditions if any. The action fields include a target device field 230 and a dropdown list action field for selecting the appropriate action to initiate on the targeted device, e.g. notification, alert, turn on or off, start or stop.

The workflow for entering network event rule 142A discussed above in connection with FIG. 1 proceeds as follows in an embodiment of the invention. If Dad is the administrator of the network event rule table, then he drags and drops the icon corresponding with Mom mobile phone from associated device window 240 into tagged device window 224. Then he selects "Arrive Home" as the triggering network event from the dropdown list trigger field in the network event 226 portion of the form. Optionally he can enter "Proximity to the front door" as a condition in the eponymous field of the network event portion 226 of the form. Next, Dad drags the icon corresponding to his mobile phone from the associated user station window 240 into the target device field 230 of the action field portion 228 of the form. Next, he selects the desired action, e.g. initiate transmission of notification to the targeted device, from the dropdown list action field. Finally, he presses the "enter/submit" button at which point he is provided the opportunity to enter any further target device-n-action pairs into the rule. He then drags and drops the remote control lock icon from the associated WAP station window 242 into the target device window 230 and selects the action of opening the lock from the dropdown list action field. He again clicks "enter" and is again asked if he has further target device action pairs for this rule. He then drags and drops the remote control light switch icon from the associated WAP station window 242 into the target device window 230 and selects the action of turning on the light from the dropdown list action field. He again clicks "enter" and completes the entry of the network event rule 142A which is entered into the network event rule table 140 maintained by either or both the WAP 102 and the remote computer device 212 maintained by the Telco or ISP.

FIGS. 3A-C are hardware block diagrams of embodiments of respectively the WAP and detailed hardware block diagrams of the station transition, condition test and action initiation circuits of the network event circuit which are part of the WAP. The WAP may have one or more antenna. The WAP 102 is shown with a MIMO pair of antenna 359A-B for supporting a wireless local area network (WLAN) which provides associated stations, access to the Internet 302. In an embodiment of the invention the WAP provides the network event based security and home automation on its own. In an embodiment of the invention the WAP is also communicatively coupled, via the shared broadband connection, to the remote cloud 210 and specifically to the remote server 212 provided by the ISP or Telco which handles portions of the network event based security and home automation functions.

The WAP in this embodiment of the invention is identified as a 2×2 multiple-input multiple-output (MIMO) WAP supporting as many as 2 discrete communication streams over two antennas 359A-B. The WAP couples to the Internet 302 via an integral Ethernet medium access control (EMAC) interface 319 over a cable, fiber, or digital subscriber line (DSL) backbone connection. A packet bus 318 couples the EMAC to the MIMO WiFi baseband 326, and the analog front end (AFE) and Radio Frequency (RF) stages 328.

In the baseband portion 326 wireless communications transmitted to or received from each user/client/station are processed. The baseband portion is dynamically configurable to support SU-MIMO or MU-MIMO transmission to MU groups of two or more users/stations. The AFE and RF portion 328 handle the upconversion on each of transmit paths and wireless transmission initiated in the baseband. The RF portion also handles the downconversion of the signals received on the receive paths and passes them for further processing to the baseband.

Transmission:

The transmit path/chain includes the following discrete and shared components. The WiFi medium access control (WMAC) component 330 includes: hardware queues 332 for each downlink and uplink communication stream; encryption and decryption circuits 334 for encrypting and decrypting the downlink and uplink communication streams; medium access circuit 336 for making the clear channel assessment (CCA), and making exponential random backoff and re-transmission decisions; and a packet processor circuit 338 for packet processing of the communication streams. The WMAC component has read access to a node table 339 which lists each node/station on the WLAN, the station's capabilities, the corresponding encryption key, and the priority associated with its communication traffic.

Each sounding or data packet for wireless transmission on the transmit path components to one or more stations is framed in the framer 340. Next each stream is encoded and scrambled in the encoder and scrambler 342 followed by interleaving and mapping in a corresponding one of the interleaver mappers 344A-B. Next all transmissions are spatially mapped with a spatial mapping matrix (SMM) 346 in the spatial mapper 348. The spatially mapped streams from the spatial mapper are input to inverse discrete Fourier Transform (IDFT) components 350A-B for conversion from the frequency to the time domain and subsequent transmission in the AFT and RF stage.

Each IDFT is coupled to a corresponding one of the transmit path/chain components in the AFT RF stage 328 for wireless transmission on an associated one of MIMO antenna 359A-B. Specifically each IDFT couples to an associated one of the digital-to-analog converters (DAC) 352A-B for converting the digital transmission to analog, upconverters 354A-B, coupled to a common voltage controlled oscillator (VCO) 366 for upconverting the transmission to the appropriate center frequency of the selected channel(s), filters 356A-B e.g. bandpass filters for controlling the bandwidth of the transmission, and power amplifiers 358A-B for setting the transmit power level of the transmission on the MIMO antenna 359A-B.

Reception:

The receive path/chain includes the following discrete and shared components. Received communications on the WAP's array of MIMO antenna are subject to RF processing including downconversion in the AFE-RF stage 328. There are two receive paths each including the following discrete and shared components: low noise amplifiers (LNA) 360A-B for amplifying the received signal under control of an analog gain control (AGC) for setting the amount by which the received signal is amplified, filters 364A-B for bandpass filtering the received signals, downconverters 368A-B coupled to the VCO 366 for downconverting the received signals, analog-to-digital converters (ADC) 370A-B for digitizing the downconverted signals. The digital output from each ADC is passed to a corresponding one of the discrete Fourier transform (DFT) components 372A-B in the baseband portion 326 of the WiFi stage for conversion from the time to the frequency domain.

Receive processing in the baseband stage includes the following sha1red and discrete components including: an equalizer 374 to mitigate channel impairments which is coupled to the output of the DFTs 372A-B. The received streams at the output of the equalizer are subject to demapping and deinterleaving in a corresponding number of the demapper/deinterleavers 376A-B. Next the received stream (s) are decoded and descrambled in the decoder and descrambler component 378, followed by de-framing in the deframer 380. The received communication is then passed to the WMAC component 330 where it is decrypted with the decryption circuit 334 and placed in the appropriate upstream hardware queue 332 for upload to the Internet 302.

The WAP also includes a network event circuit 304. The network event circuit couples to the aforesaid plurality of components which make up the transmit and receive paths. The network event circuit includes: a rule entry circuit 306, an event detection circuit 308, and a rule initiation circuit 310. The network event circuit couples to non-volatile memory or storage 320.

The rule entry circuit 306 includes an administrative I/O circuit 306A for presenting GUI 220 shown in FIG. 2C including icons corresponding to all associated and unassociated stations to the homeowner and a storage interface circuit 306B for retrieving previously entered rules from the network event rule table 322 in memory 320 for display to the user as well as for storing newly adding or updated network event rules entered by the user into the network event rule table 322.

The event detection circuit 308 shown in FIG. 3A and in detail in FIG. 3B monitors each wireless station in range of the WAP for a transition in communication status corresponding to a network event, and identifies each wireless station and the network event it has triggered. The event detection circuit includes a WiFi stage interface 308A to the plurality of components which make up the baseband 326 and AFE-FR stages 328, an association circuit, a sniffer circuit, an RSSI correlation circuit, and a beamforming direction circuit, all coupled to interface 308A as well as to the transition detection circuit 308F. The association circuit 308E couples via the WiFi stage interface to the WMAC circuit 330 to obtain information contained in its node table 339 as to each station that has probed the WAP whether or not associated with the WAP, as well as stations that routinely probe and associate with the WAP, as well as the capabilities and identity of each such station. The association circuit maintains a history of all such stations for presentment to the user as either prospective devices to tag or target for network event rules. The sniffer circuit 308D also couples via the WiFi stage interface to the WMAC circuit 330 to obtain information contained it its node table 339 as to each station detected by the WAP during any off-channel scanning conducted by the WAP in the course of its normal operation. Off channel scanning allows the WAP to evaluate unselected communication channels as prospects if the current channel becomes congested. During the off channel scanning the WMAC circuit passes any identifying information on detected stations to the sniffer circuit. Stations may be detected either on the basis of their probing of the WAP during the off-channel scan, or by deep packet inspection by the WMAC circuit of their transmissions during the off channel scan. The RSSI correlator circuit 308C couples via the WiFi stage interface to the WMAC circuit 330 and to the AGC 362 to determine the magnitude of the RSSI of each station whether or not associated with the WAP. The RSSI circuit maintains a rolling history of each station's RSSI from the aggregate of which it is able to determine the relative proximity of each station to the WAP and inferentially to other stations in the home or business. The Beamforming direction circuit 308B also couples via the WiFi stage interface to the WMAC circuit 330 and to the spatial mapper 348 to determine both sounding feedback matrices received from each station as well as beamforming matrices 346 used to transmit communications to each station. The beamforming direction circuit processes these matrices to determine at least the relative location of each station.

The transition detection circuit 308F couples to and receives input from each of the aforesaid circuits, i.e.: association circuit 308E, sniffing circuit 308D, RSSI correlation circuit 308C, and beamforming direction circuit 308B. The transition circuit monitors each over time and determines when an increase, decrease or change above a threshold amount has occurred. These transitions correspond to network events. The transition detection circuit identifies for each transition the corresponding station and network event and passes this information to the rule initiation circuit and specifically the rule lookup circuit 310B thereof.

The rule initiation circuit 310 shown in FIG. 3A and in detail in FIG. 3C determines whether the identified station and network event corresponds with one of the network event rules for the identified station in the non-volatile memory, and in the event of a match, initiates the action prescribed for the corresponding targeted device. The rule initiation circuit includes a WiFi stage interface 310A to the plurality of components which make up the baseband 326 and AFE-FR stages 328, a rule lookup circuit 310B, a condition test circuit 310C, a station identity circuit 310D, a station proximity and location circuit 310E, a time of day and day of week circuit 310F, a target locator circuit 310G and an action initiation circuit 310H.

The rule lookup circuit 310B receives input from the transition detection circuit 308F as to an identified station and corresponding network event. The rule lookup circuit searches the network event rule table 322 to determine whether there is a matching rule for which the identified station is the tagged station.

The condition test circuit 310C receives input from the rule lookup circuit as to any matching rule found in the network event rule table 322. The condition test circuit determines whether there any conditions associated with the rule and if so interacts with the corresponding one(s) of the station identity, station proximity and location and time of day and day of week circuit 310F to determine if the condition(s) are met. The station identify circuit 310D receives input via WiFi stage interface 310A and specifically the WMAC circuit 330 as to the number and identity of associated stations. If the condition calls for determining whether someone is home alone, the station identify circuit makes that determination based on the information obtained from the WMAC circuit. If the condition calls for determining whether the person at home alone is a family member the station identify circuit makes that determination based on the information obtained from the WMAC circuit 330 as well as from the tagged stations that the homeowner has previously identified as belonging to family members in the network event rule table. The proximity and location circuit 310G also receives input via the WiFi stage interface 310A from one or more of the WMAC circuit 330; the analog gain control (AGC) 362 and the spatial mapper 348 as to either or both the proximity, relative or absolute location of the tagged station. Proximity may be determined relative to the WAP or relative to one or more of the remaining stations in the home by measurements of the RSSI for each station obtained from the AGC 362. Location may be determined relative to the WAP or relative to one or more of the remaining stations in the home by measurements of the RSSI for each station obtained from the AGC 362 or more precisely from either or both the beamforming feedback matrices obtained from soundings of the associated stations, or from beamsteering or beamforming matrices used for transmissions to those stations. If the condition calls for determining whether someone is at the front door as opposed to the garage door, the proximity and location circuit makes that determination based on the information obtained from either or both the RSSI and the beamforming matrices. The time of day and day of week circuit 310F determines whether the current time of day or day of week matches the conditions in the network event rule.

The target locator circuit 310G receives input from the condition test circuit 310C as to whether the condition(s) if any in the matching network event rule found by the rule lookup circuit 310B are met. If there are no conditions, or if there are conditions and they have all been met, then the target locator circuit determines how to communicate with the station targeted by the rule, e.g. the URL, web address, station MAC, or phone number. In the case of a multiprotocol station like a mobile phone which has both 802.11 WiFi capability as well as 3G/4G LTE capability the target locator determines how to communicate with that tagged device. Next, the action initiation circuit 310H initiates the prescribed action on the targeted device. Where the prescribed action is a notification or alert the action initiation circuit composes the notification or alert and sends it to the URL, address, or number identified by the target locator circuit. If the prescribed action calls for more complex activity, such as turning on a remotely controllable light switch or locking a remote controllable door lock the action initiation circuit uses the appropriate API in its communications with the target device to initiate the required action.

In an embodiment of the invention the network event circuit is coupled to the remote computational device, e.g. remote server 212 provided by the ISP or Telco. In another embodiment of the invention, the WAP operates autonomously without connection to any network event "cloud" 210.

In an embodiment of the invention the non-volatile memory accumulates at least a portion of the historical records of each station's network events from the remote server 212 coupled to neighboring WAPs.

Figure 4A:
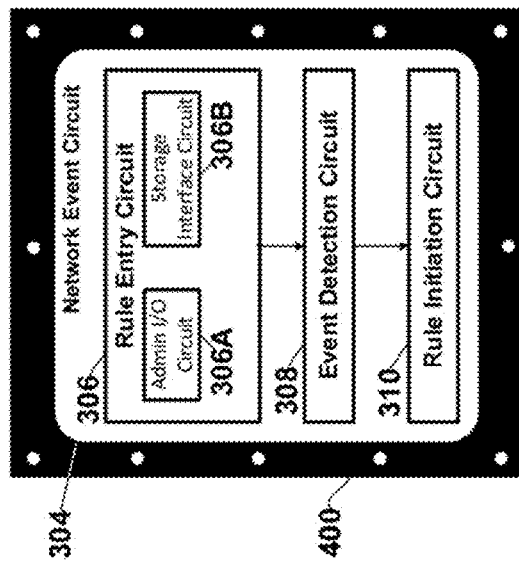
FIGS. 4A-C are hardware block diagrams of various devices configured to execute network event rule execution in a WLAN in accordance with an embodiment of the current invention.
Figure 4C:
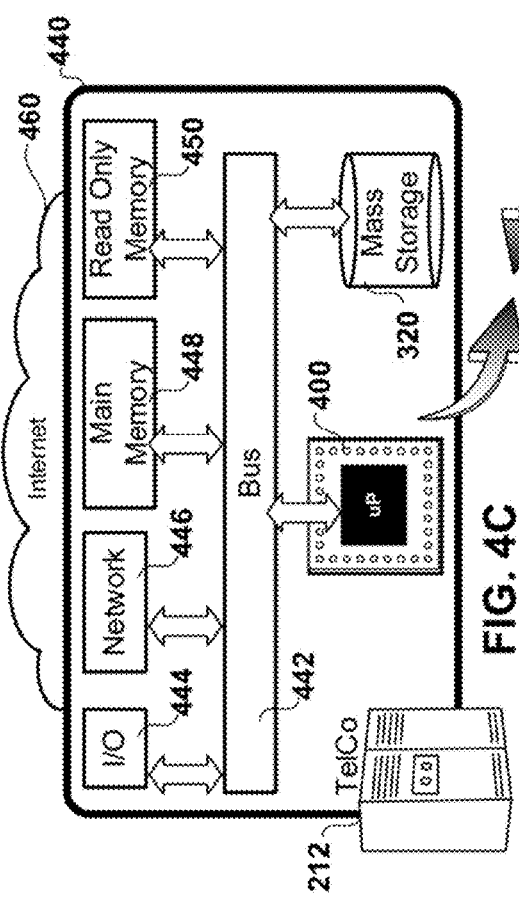
Figure 4B:
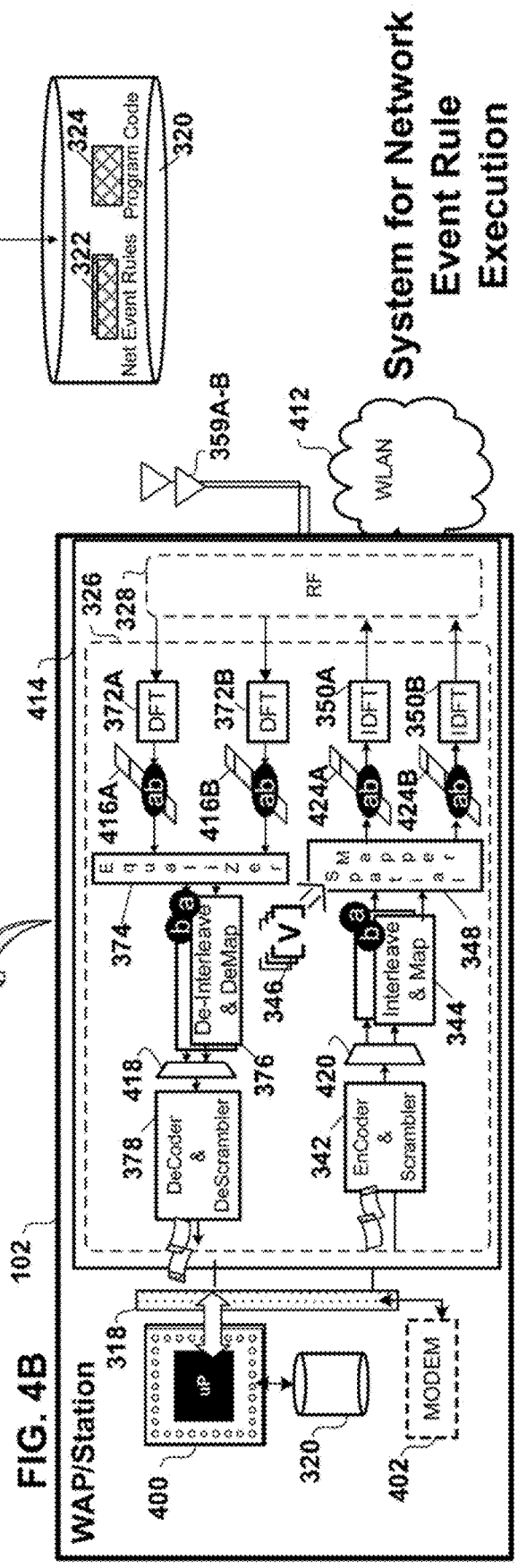

FIGS. 4A-C are hardware block diagrams of various devices configured to execute network event rule execution in a WLAN in accordance with an embodiment of the current invention.

FIG. 4A shows a very large scale integrated circuit (VLSI) processor 400 and non-volatile memory/storage element 320 configured to execute network event based security and home automation program code 324 associated with the network event based security and home automation circuit 304. The program code may be configured to run on a single device such as a WAP or station, or cooperatively on one or more host devices. The network event based security and home automation component includes modules or circuit or combinations of both which perform the corresponding functions identified for the eponymous circuits shown and discussed above in connection with FIGS. 3A-C.

FIG. 4B shows the WAP 102 configured as a host device servicing a WLAN 412 which includes one or more associated wireless stations (not shown). The WAP supports discrete communications with a station or concurrent multiple user multiple-input multiple-output (MU-MIMO) communications with multiple stations. The WAP in this embodiment of the invention is identified as a 2×2 WAP supporting as many as 2 discrete communication streams "a", "b" over two antennas 359A-B. The WAP includes: the processor 400 and storage 320; the bus 318, a WLAN stage 414 including a base band stage 326, a radio frequency (RF) stage 328 and MIMO antennas 359A-B. The WAP RF stage supports one or more IEEE 802.11 wireless local area network (WLAN) protocols. The WAP also includes a modem 402 for coupling via copper or fiber to an Internet Service Provider (ISP). The processor in addition to supporting the IEEE 802.11 WAP functionality also executes the program code which provides part or all of the network event based security and home automation functionality as discussed above.

In the baseband stage 326 transmitted communications for a client/user/station are encoded and scrambled in encoder scrambler module 342 and de-multiplexed into two streams in demultiplexer 420. Each stream "a", "b" is subject to interleaving and constellation mapping in an associated interleaver mapper 344 and passed to the spatial mapper 348. The spatial mapper uses a beamsteering matrix 346 determined from a prior isotropic sounding of the link with a station (not shown) to steer subsequent communications thereto. The beamsteering matrix specifies specific phase and amplitude adjustments for the communications on each antenna designed to steer the outgoing communications toward the recipient station. There is a discrete beamsteering matrix for each of the OFDM tones or sub-channels. The combined streams "ab" are injected into each of the OFDM tones or sub-channels 424A-B of the inverse discrete Fourier Transform (IDFT) modules 350A-B respectively. Each IDFT module is coupled via associated upconversion circuitry in the RF stage 328 to an associated one of the pair of antenna 359A-B.

In the RF Stage 328 received communications "ab" on each of the two antenna 359A-B from the user/station (not shown) are downconverted and supplied as input to the baseband stage 326. In the baseband stage the received communications are then transformed from the time to the frequency domain in the discrete Fourier Transform (DFT) modules 372A-B from which they are output as discrete orthogonal frequency division multiplexed (OFDM) tones/sub-carriers/sub-channels 416A-B. All received streams are then subject to equalization in equalizer 374. Received steams "ab" are subject to de-interleaving and constellation demapping in associated deinterleaver demapper modules 376, followed by multiplexing in multiplexer 418. The received data "ab" is decoded and descrambled in decoder descrambler 378.

FIG. 4C shows a Telco or ISP having a remote computational device, e.g. remote server 212 configured as a host device and coupled to the Internet 460. The remote server includes the processor 400 and non-volatile storage 320; a bus 442, an input/output (I/O) module 444 for interfacing with a user, a network module 446 for coupling to a network, a main memory 448 for storing and executing program code 324 and data, a read only memory 450 for storing bootup program code. The processor in addition to supporting the server functionality also executes the program code which may provide selected portions of the network event based security and home automation functionality as discussed above. In an embodiment of the invention the WAP 102 relays all network event based security and home automation to the remote server 212 which performs the rule entry, event detection and rule initiation functions for the WAP. In another embodiment of the invention all network event based security and home automation functionality resides on the WAP. In still another embodiment of the invention the network event based security and home automation functions are performed collaboratively by both the WAP and the remote server without departing from the scope of the claimed invention.

FIG. 5 is a process flow diagram of processes associated with network event based security and home automation in accordance with an embodiment of the current invention. Processes marked with a dashed border may be executed on either a wireless access point (WAP), or on a remote computational device such as a remote "cloud" server communicatively coupled to one or more WAPs, or collaboratively on both the WAP and the remote computational device, e.g. remote server, without departing from the scope of the Claimed invention.

In process 500 the entry of network event rules by the homeowner is effected. Entry may be made on any mobile phone or computer via a browser or administrative interface with the WAP or in an embodiment of the invention a remote server device, a.k.a. "Cloud" connected with the WAP. Each network event rule tags one or more stations to monitor for a network event and actions to execute on a targeted device if the tagged station causes a network event. In process 502 each network event rule is stored in a network event rule table on either the WAP or the remote server. Then in process 504 the WAP monitors the WLAN for activity of all wireless stations both associated and unassociated. In an embodiment of the invention with a remote server the WAP may at this stage relay the monitored results to the remote server for further processing. In the following process 506 any transitions in a stations communication status corresponding to a network event are detected. Such transitions include change in association status, and change above a threshold level in any one or all of: RSSI, Proximity, or location. Next, in decision process 508 a determination is made as to whether a network event has been detected. If a network event has been detected then control passes to process 510 in which the station corresponding with the network event is identified. Control is then passed to process 512 in which a lookup of the network event rule table is conducted to determine if there is a matching rule for the identified station and network event.

In decision process 514 a determination is made as to whether there is a matching rule in which the tagged station matches the identified station and network event in process 512. If there is not a matching rule then in process 516 the identified station is added to the monitored station list, if it is not already on that list, and control is returned to the monitoring process 506. Alternately, if there is a matching rule then control passes to process 520. In process 520 a determination is made as to whether there are any conditions associated with the network event. If not then control passes directly to decision process 534. If there are conditions then control passes to decision process 522. In decision process 522 a determination is made as t the condition type and control is then passed to the corresponding one of processes 524, 526, 528 for the condition determination, e.g. satisfaction or failure. In process 524 the number and identity of all stations in range of the WAP is determined and tested against the network event rule's condition, e.g. is the tagged station: home alone, or home with adult, or unidentified station in home with no family member present, etc. Control is then passed to decision process 530. In process 526 the location and or proximity of all stations in range of the WAP is determined and tested against the network event rule's condition, e.g. is the tagged station at the front door, or at the garage door, or inside the home, etc. Control is then passed to decision process 530. In process 528 the time of day, or day of week, or interval of time in the dwelling is determined and tested against the network event rule's condition, e.g. is the tagged station in range of the WAP after midnight, or on a weekend, etc. Control is then passed to decision process 530. In decision process 530 a determination is made as to whether there are any additional conditions that have not been tested and if there are control returns to process 522. Once all conditions have been tested, i.e. there are no remaining untested conditions, then decision process 530 passes control to decision process 532 in which a determination is made as to whether all conditions have been met. If they have not then control returns to the monitoring process 504. If alternately, all conditions have been met, then control passes to decision process 534.

In decision process 534 a determination is made as to the action type specified in the network event rule. If the action type is a notification or alert then control is passed to process 538 for the composition and sending of the alert or notification to the targeted device. If the action type is an actuation, e.g. of a light, camera, or lock, then control is passed to process 536 for the initiation of the actuation of the light, camera or lock for example. Then in decision process 540 a determination is made as to whether all actions prescribed in the rule have been initiated. If all actions have been initiated, i.e. if there are no remaining actions to initiate, then control returns to process 504. Alternately, if all actions have not been initiated, i.e. if there are remaining actions to initiate, then control returns to process 534.

Examples

This home automation and security solution enables the owner of an AP/Wi-Fi network to: a) track known users who join the network; b) track non-malicious unauthorized requests (automatic, e.g. probe requests, small number of association requests); c) detect and track malicious attacks e.g. multiple trials with probe requests with matching SSID but failed 4 way handshake, large number of failed connection requests within a short period of time, WPS/WEP flaws, de-authentication packets from outside the network, failed MAC filter, etc.; d) triggering other security measures when unauthorized/new device is in vicinity, e.g. turn on front lights, position security camera etc.; e) tracking a lost tagged device in a Telco network; f) tracking child monitors attached to infants/babies/kids while they are with babysitters etc. while you are away; g) controlling resources, e.g. air circulation, temperature, light, by monitoring active known/unknown devices in an area for enterprise applications or home automation. Authorized devices can monitor home networks remotely through connected cloud services.

In an embodiment of the invention actions are triggered automatically on the basis of OSI layer 2 events (e.g. probe requests, connection attempts etc.). The events start a list-update and algorithm-run which update a list locally or remotely and trigger an event, e.g. notify an authorized user or switch off access to a part of the network. The AP maintains an internal list, locally or saved remotely on the cloud, containing identifying properties like MAC address, RSN, capabilities, etc. along with a timestamp and its network status for all devices that trigger any network event, e.g. send probe request, join network etc. The network status has a one to one correspondence to a respective network event. Some examples of network status are: probe request reception, successful association, associated but authentication failure, association rejected, active device, inactive device, tagged device etc. The AP can run two events: a list-update where it updates the maintained list and an algorithm-run where it runs a set of predefined algorithms which can trigger local events, e.g. switch on lights or remote events, e.g. notify an authorized device, etc. The list-update and algorithm-run events are triggered on each of the above network events for any station interacting with the AP. Note that for probe request events, the device doesn't even need to make a connection attempt or have the AP's SSID in the probe request list. The STA just needs to send a probe request as a broadcast frame.

The following user defined actions can be taken by authorized users. The user, e.g. the owner of the AP/network, can tag devices in the list. The tagging can be pre-empting (e.g. tagging family members, friends etc.) or once another event has happened (e.g. when a phone gets stolen, it can be tagged so that if it shows up in or near any of the WLANs managed by a Telco "cloud" service the Telco's cloud service network can notify the tagged stolen device to its owner. Authorized devices, enabled by the user, can access this list remotely. User can setup predefined rules/actions to be executed when a certain condition is met e.g. for a certain tagged device or a network event.

Normally, the AP is in the idle state. When a broadcast frame is noticed on the air, the AP checks the parameters on frame and depending on the settings, e.g. if it matches the conditions for an event, e.g. tagged or new device, it goes into the event detection state. If the AP receives a link setup request, e.g. an association or authentication request, it goes into the link setup state. In either of these states further triggers can be detected depending on the settings, e.g. a tagged device joined the network, or a detected new device is tagged as stolen on the Telco's "cloud" server. When an event is detected, the local/remote list is updated with the observed device details and the event action, e.g. local or remote, is automatically started. If notifications are setup, they are sent to the authorized user notifying of the event.

Triggers (Network Events):

In the case of a household, users can tag family members and household devices. In the case of a businesses, the company/owner can tag the employees or equipment. In the case of a store, the manager/owner can tag repeat/regular customers.

Tags:

When a tagged user's wireless device, e.g. a family member's device, joins the network after a period of idle time an action may be triggered. When a tagged user, e.g. a friend, comes close to your home at night an action may be triggered. When an unknown device has multiple failed connection attempts an action may be triggered. When frequent denials happen from the same unknown device, the cloud can trigger stronger security measures (MAC address filtering) or blacklist the device, in addition to notifying the owner of the network an action may be triggered. If the AP detects a known attack on WEP/VVPS/out of network de-auth, it will immediately disable the feature and notify the owner of the network.

Actions:

Actions taken in response to network events include: a) notifying authorized user(s) that the babysitter brought back kids from home; b) lowering the temperature when no users are at home for more than 30 min; c) switching on the porch light when a tagged user is close by at night; d) notifying authorized user(s) when a stolen phone shows up in a Telco network with exact coordinates etc; e) notifying authorized user(s) when an unknown device tries and fails to connect to the network multiple times; f) starting video recording in front of the garage when an unknown device shown up in the AP in the garage.

In an embodiment of the invention a cloud framework exists which the AP can access to store and query data. A user is able to tag known devices. Frequently, users are unaware of the details are shared automatically during network joining and hence many people could share information that they don't want to. For example an AP could receive probe requests of the neighbors and in the process save the list of other BSSIDs contained in the probe request, which may disclose the locations they have been to in the past. Special care should be taken to prevent snooping into sensitive data, e.g. tracking someone intentionally without their knowledge.

In another embodiment of the invention, all the data is kept in the AP locally. The trigger conditions prompt the user when the user connects to the appropriate app/web UI of the AP. Alternatively, the data can trigger a notification to the authorized users even when they are not connected to the local network through a cloud service. The cloud service is used only to route notifications and the data is always stored locally. All the data is sent to a cloud server where the user has registered and the log and triggers are managed remotely. All the data and decisions are done in the cloud, so the authorized user doesn't need to be connected to the local network to manage it or receive notifications.

In various embodiments of the invention user can setup network event rules which: a) tag and log known and unknown devices based on their layer 2 protocol frames over the air, even without any connection attempt to join the local network; b) track and log unknown devices near our network; c) triggers can work for devices which don't even try to connect to the network; d) ability to define custom triggers and actions based on network presence or access attempts; e) additionally the triggers and actions don't need to be local; f) trigger remote notifications and remote actions, using a cloud service, to an authorized user based on OSI layer 2 events, default or user defined. g) trigger events based on a shared tagged list of known/unknown devices that authorized users can download locally or remotely; h) trigger events based on a cloud connected network detecting a tagged device outside the local network.

The components and processes disclosed herein may be implemented in a combination of software, circuits, hardware, and firmware, coupled to the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method, comprising:
    gathering wireless communications activity at a location of a wireless access point (WAP) of one or more wireless stations in proximity to the WAP;
    analyzing the gathered wireless communications activity to track behavior of the one or more wireless stations in proximity to the WAP;
    determining whether the gathered wireless communications activity corresponds to a conditional parameter for a network event rule, the conditional parameter related to a network event, wherein the network event rule indicates at least one tagged wireless station to monitor for the network event, wherein the network event includes an unknown device being detected in range of the WAP or the at least one tagged wireless station, the network event rule including an action, based on the conditional parameter, for a target device to undertake responsive to the unknown device being within range of the WAP, the target device operatively coupled to a wireless local area network (WLAN) of the WAP; and
    in response to the conditional parameter for the network event rule being satisfied, initiating the action for the target device indicated by the network event rule,
    wherein the network event rule is programmatically entered or is generated by the WAP based on the behavior of the one or more wireless stations in proximity to the WAP.

2. The method of claim 1, wherein a particular conditional parameter for a security network event rule is satisfied at least in part by the gathered wireless communications activity including intercepting probe requests transmitted from the unknown device, and the security network event rule initiates a security action for a security target device.

3. The method of claim 1, wherein analyzing the gathered wireless communications comprises maintaining a table of tags to identify wireless stations and track the behavior of each of the wireless stations.

4. The method of claim 1,
    wherein analyzing the gathered wireless communications activity comprises determining usage patterns by tracking a specified wireless station in proximity to the WAP, and detecting one or more reactions of a specified target device that correspond to specified wireless station; and
    determining a new network event rule for the specified wireless station with conditional parameters from the usage patterns to automatically initiate the reaction for the specified the target device based on future gathered wireless communications activity from the specified target device.

5. The method of claim 1, wherein the wireless communications include activity independent of the one or more wireless stations authenticated with the WAP.

6. The method of claim 1, wherein gathering the wireless communication activity comprises intercepting wireless communication activity of a wireless station that is unassociated with the WAP.

7. The method of claim 1, wherein gathering the wireless communication activity is via at least one of channel scanning, deep packet inspection, and probe requests.

8. The method of claim 1, wherein the conditional parameter for the network event rule includes a change in proximity of the one or more wireless stations relative to the WAP based on the gathered wireless communications activity.

9. The method of claim 1, wherein the conditional parameter for the network event rule include a transition in communication status of the one or more wireless stations relative to the WAP based on gathered wireless communications activity.

10. The method of claim 1, wherein the conditional parameter relates to at least one of: a proximity, a location, a received signal strength indication (RSSI), or an association status of the one or more wireless stations.

11. The method of claim 8, wherein the change in proximity indicates whether the one or more wireless stations is moving towards or away from the WAP based on the gathered wireless communications activity.

12. The method of claim 2, wherein the particular conditional parameter for the security network event rule is further satisfied at least in part by determining an administrator tagged wireless station is not in proximity to the WAP, and the security action for the security target device includes at least one of turning on a light, recording with a security camera, and notifying a remote security service.

13. The method of claim 3, wherein a tag of a previously identified wireless station is used each time wireless communications activity of that identified wireless station is gathered in proximity to the WAP.

14. The method of claim 3, further comprising assigning a new tag in the table of tags for wireless communications activity gathered from an unidentified wireless station.

15. The method of claim 3, further comprising assigning a wildcard tag for wireless communications activity intercepted from an unidentified wireless station that is not authenticated by the WAP.

16. A method comprising
initiating an action of a targeted device based on wireless communications activity gathered at a location of a wireless access point (WAP), wherein the gathered wireless communications activity is of one or more wireless stations in proximity to the WAP, wherein the wireless communications includes activity independent of the one or more wireless stations relationship with the WAP;
wherein a network event rule indicates at least a network event, a specified wireless station having been assigned to monitor for the network event, and the action of the targeted device, wherein the network event rule is triggered by a conditional parameter being satisfied based on gathered wireless communications activity for the specified wireless station indicating an occurrence of the network event, wherein the network event includes an unknown device being detected in range of the WAP or the specified wireless station, the action of the targeted device being initiated responsive to the unknown device being within range of the WAP, and wherein the network event rule is programmatically entered or is generated by the WAP based on the activity of the one or more wireless stations in proximity to the WAP.

17. The method of claim 16, wherein gathering the wireless communication activity is via at least one of channel scanning and deep packet inspection.

18. The method of claim 16, further comprising determining a new network event rule for the specified wireless station to automatically initiate an observed action for a corresponding target device with conditional parameters based on usage patterns from gathered wireless communications activity from the specified wireless station.

19. A wireless access point (WAP) configured to support wireless communications on a wireless local area network (WLAN), and the WAP comprising:
a plurality of components coupled to one another to form transmit and receive paths for processing wireless communications;
a non-volatile memory storing network event rules wherein one or more network event rules indicate at least conditional parameters to initiate an action for a targeted device;
an event detection circuit to gather wireless communications activity at a location of a wireless access point (WAP) of one or more wireless stations in proximity to the WAP, and analyze the gathered wireless communications activity to track behavior of the one or more wireless stations in proximity to the WAP; and
a rule initiation circuit to initiate an action for a target device indicated by a network event rule, wherein the conditional parameters are satisfied at least in part by the gathered wireless communications activity from a tagged wireless station of the one or more wireless stations indicating an occurrence of a particular network event, wherein the particular network event includes an unknown device being detected in range of the WAP or the tagged wireless station, the action for the targeted device being initiated responsive to the unknown device being within range of the WAP, and wherein the network event rule is programmatically entered or is generated by the WAP based on the behavior of the one or more wireless stations in proximity to the WAP.

20. The WAP of claim 19, wherein the conditional parameters for a network event rule include a change in proximity of the one or more wireless stations relative to the WAP based on the gathered wireless communications activity.

21. The WAP of claim 19, wherein to gather the wireless communication activity, the event detection circuit is to intercept wireless communication activity of a wireless station that is unassociated with the WAP.

22. The WAP of claim 19, wherein the conditional parameter relates to at least one of: a proximity, a location, a received signal strength indication (RSSI), or an association status of the one or more wireless stations.

* * * * *